United States Patent [19]

Voyles

[11] 4,093,972

[45] June 6, 1978

[54] ANODE TERMINATION MEANS FOR AN ELECTRICAL DEVICE COMPONENT

[75] Inventor: Gerald A. Voyles, Indianapolis, Ind.

[73] Assignee: P. R. Mallory & Co. Inc., Indianapolis, Ind.

[21] Appl. No.: 794,299

[22] Filed: May 5, 1977

Related U.S. Application Data

[63] Continuation of Ser. No. 639,371, Dec. 10, 1975, abandoned.

[51] Int. Cl.² .................... H01G 9/00; H01L 23/28
[52] U.S. Cl. ................................ 361/433; 357/72; 29/570
[58] Field of Search .............. 361/433; 29/570; 357/72

[56] References Cited

U.S. PATENT DOCUMENTS

| | | | |
|---|---|---|---|
| 2,809,332 | 10/1957 | Sherwood | 357/72 |
| 3,223,903 | 12/1965 | Solomon | 357/72 |
| 3,341,752 | 9/1967 | Fournier | 357/72 |
| 3,675,087 | 7/1972 | Zykov et al. | 361/433 |
| 3,795,844 | 3/1974 | Markarian | 361/433 |
| 3,828,227 | 8/1974 | Millard et al. | 361/433 |
| 3,855,505 | 12/1974 | Karlik et al. | 361/433 |

*Primary Examiner*—Andrew J. James
*Attorney, Agent, or Firm*—Hoffmann, Meyer & Coles

[57] ABSTRACT

An electrical device comprising electrical component means and electrical termination means, the termination means including riser means in electrical contact with the electrical component means, elongated metal containing member joined to the riser means and a metal containing end cap over the elongated metal containing member and conductivity connected thereto by electrically conductive adhesive material. In a preferred embodiment, the electrical device is a chip type, solid electrolyte film forming metal capacitor.

11 Claims, 1 Drawing Figure

U.S.Patent   June 6, 1978   4,093,972
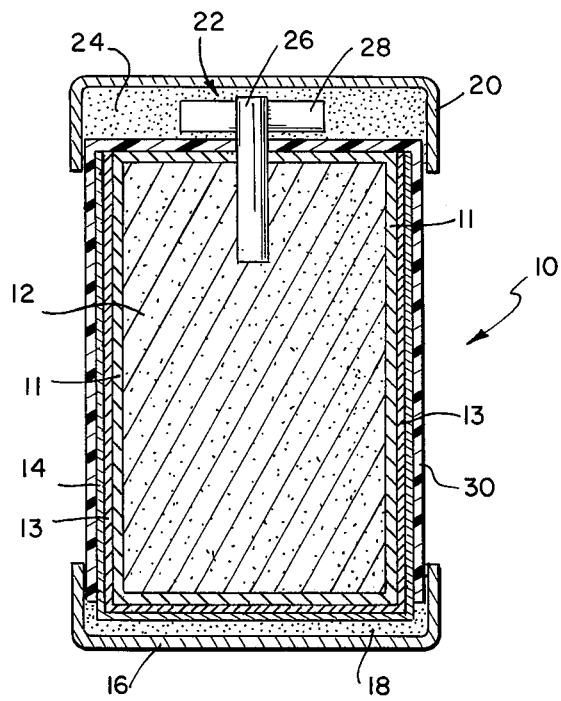

ANODE TERMINATION MEANS FOR AN ELECTRICAL DEVICE COMPONENT

This is a continuation of application Ser. No. 639,371, filed Dec. 10, 1975, and now abandoned.

The present invention relates to termination means for electrical devices and more specifically, in a preferred embodiment, to anode termination means for leadless, solid electrolyte dielectric oxide film-forming metal capacitors generally known as "chip" type capacitors.

While the present invention may be adaptable to a variety of electrical devices including batteries, resistors, transistors and the like, it will be discussed hereinafter with reference to a preferred embodiment, that is, chip type, solid electrolyte film forming metal capacitors. It should be understood however, that the present invention is not thereby so limited.

Advances in electronic circuitry and systems have necessitated the development of a capacitor having a high capacitance per unit volume, low impedance at high frequencies and having the external geometry to be able to be applied to circuit boards in an automated operation. The chip type capacitor, by having minimal external lead length has very low impedance characteristics at high frequency, high volumetric efficiency and, because of its geometry, is able to be placed on a circuit board in an automated assembly operation and then reflow soldered thereto.

Present efforts to provide such a capacitor with these characteristics have been directed toward solid electrolyte film-forming metal type capacitors of which U.S. Pat. Nos. 3,828,277 and 3,855,505 exemplify the design approaches that have been taken. Capacitors of these types generally include a pressed and sintered tantalum anode having a myriad of intercommunicating void areas. The anode is generally in a rectangular shape to facilitate placement and soldering of the finished capacitor on a circuit board. A dielectric oxide film is anodically formed over the anode and a solid electrolyte layer of semi-conducting material such as manganese dioxide is over the dielectric oxide film. Electrically conductive layers of materials such as carbon, silver, copper and the like are over the semi-conducting layer, the electrically conducting layers providing electrical connection for the cathode side of the capacitor. Electrical termination for the capacitor is provided by metal containing caps over the ends of the capacitor. The cathodic end cap is electrically connected by means such as conductive adhesives to the conducting layers over the anode. Termination to the anodic end cap is made by means of an anode riser which is embedded or welded to the anode at one end and welded at a hole in the end cap at other end of the riser. The surfaces of the capacitor not covered by end caps are generally protected by an electrically insulating material such as a polymer resin.

Various problems may be associated with the above type of anode termination means where the anode riser is electrically connected to the anodic end cap by having the anode riser project through a hole in the end cap and then welding the riser to the end cap. By necessity, the anode riser usually has a very small diameter and thus the welded area of electrical connection between the anode riser and the end cap is also quite small and therefore may be very fragile. This small welded connection may fail when the capacitor is subjected to abusive handling, vibration, thermal cycling, and the like. If the welded connection fails, the capacitor may no longer be operable.

The probabilities of weld failure are particularly acute during thermal cycling of the capacitor. These capacitors are often subjected to temperature extremes ranging from about $-50°$ C to about $+85°$ C. Differences in the thermal coefficients of the expansion of the materials of the riser, weld and end cap may produce stresses greater than the strength of the weld, especially after repeated thermal cycling. Such stresses may produce a degradation of the electrical characteristics of the capacitor or even complete failure of the capacitor.

It is therefore a feature of the present invention to provide an electrical device having electrical component means and improved termination means. It is also a feature of the present invention to provide a chip type dielectric oxide film forming capacitor with improved anode termination means. Another feature of the present invention is that the termination means includes an elongated metal containing member such as a conductive wire or ribbon attached to a riser means and the riser means and member conductively connected to a surrounding metal containing end cap by means such as a conductive adhesive. These and various other features of the invention as well as many specific advantages will become more fully apparent from a detailed consideration of the remainder of this disclosure including the examples and the appended claims in conjunction with the accompanying drawing in which is shown a cross-sectional view of a chip type solid electrolyte film-forming metal capacitor incorporating the concepts of the present invention.

In its broader aspects, the present invention comprehends an electrical device comprising electrical component means and electrical termination means, the termination means including riser means in electrical contact with the electrical component means, elongated metal containing member joined to the riser means and a metal containing end cap over the elongated metal containing member and conductively connected thereto by electrically conductive adhesive material. In a preferred embodiment, the present invention comprehends a chip type capacitor comprising an anode containing film forming metal, a dielectric oxide film over the anode, a cathode including solid electrolyte over the dielectric oxide film and at least one electrically conductive layer over the electrolyte, cathode termination means and anode termination means, the anode termination means including anode riser means extending from the anode, elongated metal containing member joined to the anode riser means, and metal containing end cap over the elongated metal containing member and conductively connected thereto by electrically conductive adhesive material.

The invention can be more clearly understood by reference to the drawing which illustrates a preferred embodiment of the present invention, a chip type solid tantalum capacitor.

Capacitor 10 includes a tantalum anode 12 formed by the pressing and sintering of tantalum powder into a bonded mass having a myriad of interconnecting voids. Anode 12 may have a generally rectangular shape. Formed over anode 12 are the conventional layers of a dielectric oxide film (11), a semi-conducting layer such as manganese dioxide (13) over the dielectric oxide film and one or more electrically conducting layers 14 containing silver, copper, particulate carbon and the like forming the cathode side of the capacitor. External electrical termination for the cathode is made by metallic end cap 16 conductively connected to the conducting layers 14 by a conductive adhesive material 18 such as an epoxy resin filled with particulate silver. Other means for external electrical termination for the cathode may also be utilized.

External electrical connection for the anode 12 is made by metallic end cap 20 conductively connected to anode riser assembly 22 by electrically conductive adhesive material 24 such as an epoxy resin filled with particulate silver. Anode riser assembly 22 includes a tantalum riser 26 embedded at one end in anode 12 and joined at the other end to an elongated metal containing member 28 at a substantially right angle. Elongated conductive member 28 may be a wire or ribbon of a metal such as nickel that can be welded to tantalum. An electrically insulating layer 30 is at least over those portions of the capacitor 10 that are not covered by end caps 16 and 20. Note that electrically insulating layer 30 may extend over the top of the anode 12 and thereby electrically isolate the conductive adhesive material 24 from the anode. The electrically insulating layer 30 may be a thermoplastic or thermosetting resin such as epoxy resin.

The anode 12 of the capacitor 10 may be in a variety of shapes including cylindrical and rectangular, that is, having flat rectangular surfaces. The preferred shape for the purposes of the present invention is rectangular, more preferably, with six surfaces, because of ease of handling and ease of assembly of the capacitor into electrical circuits as the capacitor may be flush mounted.

End caps 16 and 20 may contain a wide variety of solderable, electrically conductive materials such as nickel, copper, copper alloys and the like. The end caps 16 and 20 for a rectangularly shaped capacitor 10 may have two, three or four sides, preferably four sides as this type end cap offers greater protection for the capacitor and simplifies placement of the capacitor 10 on a circuit board. If the anode 12 is cylindrical in shape, the end caps 16 and 20 may be cup shaped so as to fit snugly over the ends of the anode and thereby minimize the volume of the finished capacitor 10. One of the end caps for the capacitor 10 may be made magnetic so as to indicate polarity and thereby facilitate automatic assembly of the capacitor into a circuit.

The conductive adhesive material 18 and 20, as was stated above, may be an epoxy resin filled with particulate silver. Other conductive adhesive materials are also contemplated by the present invention such as other resin systems filled with electrically conductive particles or even low melting metals and alloys which have adhesive characteristics toward the other components of the capacitor such as certain solders.

One of the purposes of elongated member 28 of anode riser assembly 22 is to provide a greater surface area for electrical contact between the anode 12 and the end cap 20. In addition, the anode riser 26 may have portions or even all of its surface covered by a dielectric oxide film and thus good electrical contact between the end cap 20 and anode riser by the conductive adhesive material 24 would be difficult to achieve without the use of an elongated metal containing member 28 welded to the anode riser. Also, the conductive adhesive material 24 may adhere better to the elongated metal containing member 28 than to the anode riser 26.

It should be realized that the relative thickness of layers 11, 13, 14, 18 and 30 are exaggerated in the drawing for purposes of clarity and may not accurately reflect the relative thicknesses of these layers in an actual capacitor.

A method of making the above described capacitor 10 includes conventionally processing a suitably shaped pressed and sintered anode with embedded anode riser 26 up to and including the application of the conducting layers 14 such as carbon particles and silver paint. The layered anode 12 may be then selectively coated with an electrically insulating resin material by methods such as brushing, painting, dipping or the like and then cured to produce layer 30. Alternatively, the electrically insulating layer 30 could be provided by a preformed sleeve of resin material. Elongated metal containing member 28 is joined to the anode riser 26 by a method such as welding and the like. A conductive adhesive material 24 such as epoxy resin filled with silver particles is then applied to both ends of the capacitor 10 and end caps 16 and 20 pressed over the conductive adhesive material. After the conductive adhesive material 24 has dried or cured, the capacitor is then operable.

The above capacitor 10 is characterized as having a high volumetric efficiency, that is, a high capacitance per unit volume. In addition, the termination means for the anode side of the capacitor 10 is less likely to fail during rough handling, vibration, thermal cycling and the like since the electrical connection is not dependent entirely upon a weld between an anode riser and an end cap. Methods of assembly of a chip type capacitor may also be simplified.

While the present invention has been described with reference to particular embodiments thereof, it will be understood that numerous modifications may be made by those skilled in the art without actually departing from the spirit and scope of the invention as defined in the appended claims.

I claim:

1. A chip type capacitor comprising at least two sides of opposite polarities and a termination means wherein the termination means includes a riser means in electrical contact with at least one of the sides, an elongated metal containing member joined to the riser means, and a metal containing end cap over the riser means having electrically conductive adhesive material therebetween whereby the metal containing end cap is electrically and mechanically coupled to the elongated metal containing member.

2. The capacitor of claim 1 further comprising an anode containing film forming metal, a dielectric oxide film over the anode, a cathode including solid electrolyte over the dielectric oxide film and at least one electrically conductive layer over the electrolyte, and the riser means of the termination extends from the anode.

3. The capacitor of claim 2 also including electrically insulating material over at least a portion of the electrically conductive layer.

4. The capacitor of claim 2 wherein the film forming metal of the anode is tantalum and the electrolyte contains manganese dioxide.

5. The capacitor of claim 2 wherein the elongated metal containing member is a ribbon shaped member.

6. The capacitor of claim 2 wherein the elongated metal containing member is a wire shaped member.

7. The capacitor of claim 2 wherein the elongated metal member is joined to the anode riser by a weld.

8. The capacitor of claim 2 which also includes cathode termination means comprising a metal containing end cap electrically connected to the cathode by conductive adhesive material.

9. The capacitor of claim 8 wherein the anode has a rectangular type shape.

10. The capacitor of claim 9 wherein the end caps have four sides.

11. In a method of making the capacitor of claim 1 comprising the steps of providing a chip type capacitor with riser means in electrical contact with at least one of the sides of the capacitor, joining an elongated metal containing member to the riser means, and connecting the riser means to a metal containing end cap by electrically conductive adhesive material.

* * * * *